United States Patent
Kikuchi et al.

(10) Patent No.: US 11,125,582 B2
(45) Date of Patent: Sep. 21, 2021

(54) ROTATION DETECTION DEVICE

(71) Applicant: ALPS ALPINE CO., LTD., Tokyo (JP)

(72) Inventors: Shinji Kikuchi, Miyagi-ken (JP); Keisuke Nakayama, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 149 days.

(21) Appl. No.: 16/674,290

(22) Filed: Nov. 5, 2019

(65) Prior Publication Data

US 2020/0072640 A1    Mar. 5, 2020

Related U.S. Application Data

(63) Continuation of application No. PCT/JP2018/017714, filed on May 8, 2018.

(30) Foreign Application Priority Data

Jun. 15, 2017  (JP) .............................. JP2017-117451

(51) Int. Cl.
  *G01D 5/14* (2006.01)
  *G01B 7/30* (2006.01)
(52) U.S. Cl.
  CPC ...... *G01D 5/14* (2013.01); *G01B 7/30* (2013.01)
(58) Field of Classification Search
  CPC .................................. G01D 5/14; G01B 7/30
  See application file for complete search history.

(56) References Cited

U.S. PATENT DOCUMENTS

| | | | |
|---|---|---|---|
| 6,155,106 A | 12/2000 | Sano | |
| 6,784,661 B2 * | 8/2004 | Okuma | G01D 5/04 324/207.2 |
| 6,804,888 B2 | 10/2004 | Nishikawa et al. | |
| 7,665,573 B2 * | 2/2010 | Lee | B62D 15/0215 180/444 |
| 7,841,231 B2 * | 11/2010 | Kang | G01D 5/04 73/117.02 |
| 8,281,687 B2 | 10/2012 | Koma et al. | |
| 8,813,578 B2 * | 8/2014 | Kaess | B62D 15/0215 73/862.333 |
| 9,086,269 B2 * | 7/2015 | Takayanagi | G01B 7/30 |
| 9,212,892 B2 * | 12/2015 | Takayanagi | B62D 15/0245 |

* cited by examiner

*Primary Examiner* — Walter L Lindsay, Jr.
*Assistant Examiner* — Milton Gonzalez
(74) *Attorney, Agent, or Firm* — Hunton Andrews Kurth LLP

(57) ABSTRACT

A wheel portion allows a shaft body that serves as a detection object to be inserted therein in a direction of a rotational axis from a position in front of the wheel portion, and is rotated about the rotational axis when the shaft body is rotated. The wheel portion includes a tubular portion in which the shaft body is inserted and a projecting edge portion extending away from the rotational axis at a front end of the tubular portion. The housing portion includes a cover portion having a hollow tubular opening portion in which the shaft body is inserted. The cover portion and the wheel portion are engaged with each other such that the opening portion is located on an inner side of the projecting edge portion.

4 Claims, 10 Drawing Sheets

ROTATION DETECTION DEVICE

CLAIM OF PRIORITY

This application is a Continuation of International Application No. PCT/JP2018/017714 filed on May 8, 2018, which claims benefit of Japanese Patent Application No. 2017-117451 filed on Jun. 15, 2017. The entire contents of each application noted above are hereby incorporated by reference.

BACKGROUND OF THE INVENTION

1. Field of the Invention

The present invention relates to a rotation detection device that detects an angle by which a shaft body has rotated about a central axis thereof.

2. Description of the Related Art

Japanese Unexamined Patent Application Publication No. 11-51636 describes a rotational angle detection device including a rotor that rotates together with a steering shaft when the steering shaft rotates and a support body disposed outside a tubular portion of the rotor. The rotational angle detection device is disposed in a case in such a manner that the tubular portion of the rotor is inserted in an insertion hole in the support body. The rotor includes a disc portion that extends outward from the tubular portion and engagement projections that project inward. A detection object is provided on a peripheral surface of the disc portion. The support body includes a cylindrical portion and a sensor support portion that projects outward from the cylindrical portion. A sensor is fixed to the sensor support portion so that the sensor faces the peripheral surface of the disc portion of the rotor. The steering shaft has a pair of grooves formed in a peripheral surface thereof so as to extend in an axial direction, and is inserted in the tubular portion in such a manner that the engagement projections of the rotor are engaged with the grooves. According to this structure, when the rotor rotates in response to rotation of the steering shaft, movement of the detection object is detected by the sensor.

However, according to the rotational angle detection device of Japanese Unexamined Patent Application Publication No. 11-51636, the tubular portion of the rotor may project inward beyond extension of an inner peripheral surface of a hole formed in the case due to errors in attachment of the rotor to the case or manufacturing errors in the shape of the rotor. When the steering shaft is inserted into the hole in the case in such a state, there is a risk that the steering shaft will come into contact with the tubular portion of the rotor that projects inward. When the steering shaft comes into contact with the tubular portion, damage to the rotor, the support body, or the steering shaft and displacement between the rotor and the support body may occur.

SUMMARY OF THE INVENTION

The present invention provides a rotation detection device including a rotor to be engaged with a shaft body that serves as a detection object, the rotation detection device being capable of preventing contact between the shaft body and the rotor even when the rotor has attachment errors or manufacturing errors, or capable of reducing damage to and displacements of components even when the contact occurs.

A rotation detection device according to the present invention includes a housing portion; a wheel portion having a rotational axis and retained by the housing portion such that the wheel portion is rotatable about the rotational axis; a magnet body retained by the housing portion, the magnet body rotating in response to rotation of the wheel portion so that a magnetic field of the magnet body changes; and a magnetic detection portion disposed on the housing portion at a position corresponding to a position of the magnet body, the magnetic detection portion detecting the magnetic field of the magnet body. The wheel portion allows a shaft body that serves as a detection object to be inserted therein in a direction of the rotational axis from a position in front of the wheel portion, and is rotated about the rotational axis when the shaft body is rotated. The wheel portion includes a tubular portion in which the shaft body is inserted and a projecting edge portion extending away from the rotational axis at a front end of the tubular portion. The housing portion includes a cover portion having a hollow tubular opening portion in which the shaft body is inserted. The cover portion and the wheel portion are engaged with each other such that the opening portion is located on an inner side of the projecting edge portion.

Accordingly, when the shaft body is inserted into the rotation detection device, the shaft body comes into contact more easily with the cover portion, which is disposed on an outer side of the wheel portion, than with the wheel portion. Therefore, the wheel portion is prevented from receiving a strong impact.

In the rotation detection device according to the present invention, a ridge portion between an inner peripheral surface of the tubular portion and the projecting edge portion is preferably chamfered.

In this case, even when the shaft body that is being inserted into the rotation detection device comes into contact with the wheel portion that serves as a rotor, the impact can be reduced. Therefore, damage to and displacements of the shaft body, the wheel portion, and other components can be prevented.

In the rotation detection device according to the present invention, an inner peripheral surface of the opening portion preferably includes a guide surface shaped such that an inner diameter of the guide surface decreases with increasing distance toward a downstream side in a direction in which the shaft body is inserted.

In this case, the shaft body can be smoothly guided into the device, and can be prevented from coming into contact with components such as the wheel portion.

In the rotation detection device according to the present invention, preferably, the projecting edge portion includes a step portion forming a small diameter portion at a downstream side in a direction in which the shaft body is inserted and a large diameter portion located upstream of the small diameter portion and having an inner diameter greater than an inner diameter of the small diameter portion, and the opening portion is engaged with the step portion so that the cover portion and the wheel portion are joined together.

In this case, the wheel portion can be easily retained by the cover portion, and the rotation of the wheel portion can be stabilized. In addition, the opening portion can be easily disposed on the inner side of the wheel portion, so that the shaft body can be easily prevented from coming into contact with the wheel portion.

According to the present invention, even when the wheel portion, which serves a rotor, has attachment errors or manufacturing errors, contact between the shaft body and the rotor can be prevented. Alternatively, even when the contact occurs, damage to and displacements of components can be reduced.

DESCRIPTION OF THE PREFERRED EMBODIMENTS

Figure 1:
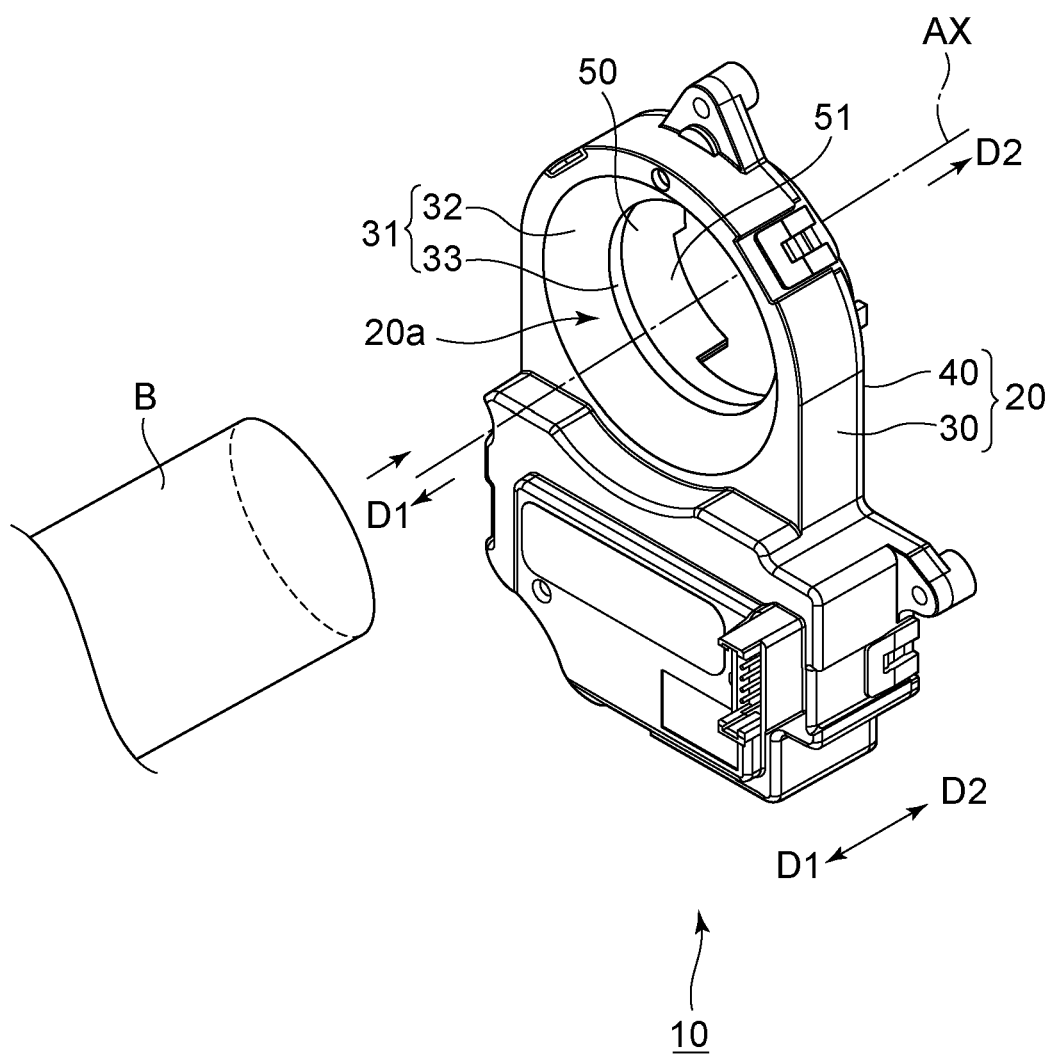
FIG. 1 is a front perspective view of a rotation detection device according to an embodiment of the present invention.
Figure 2:
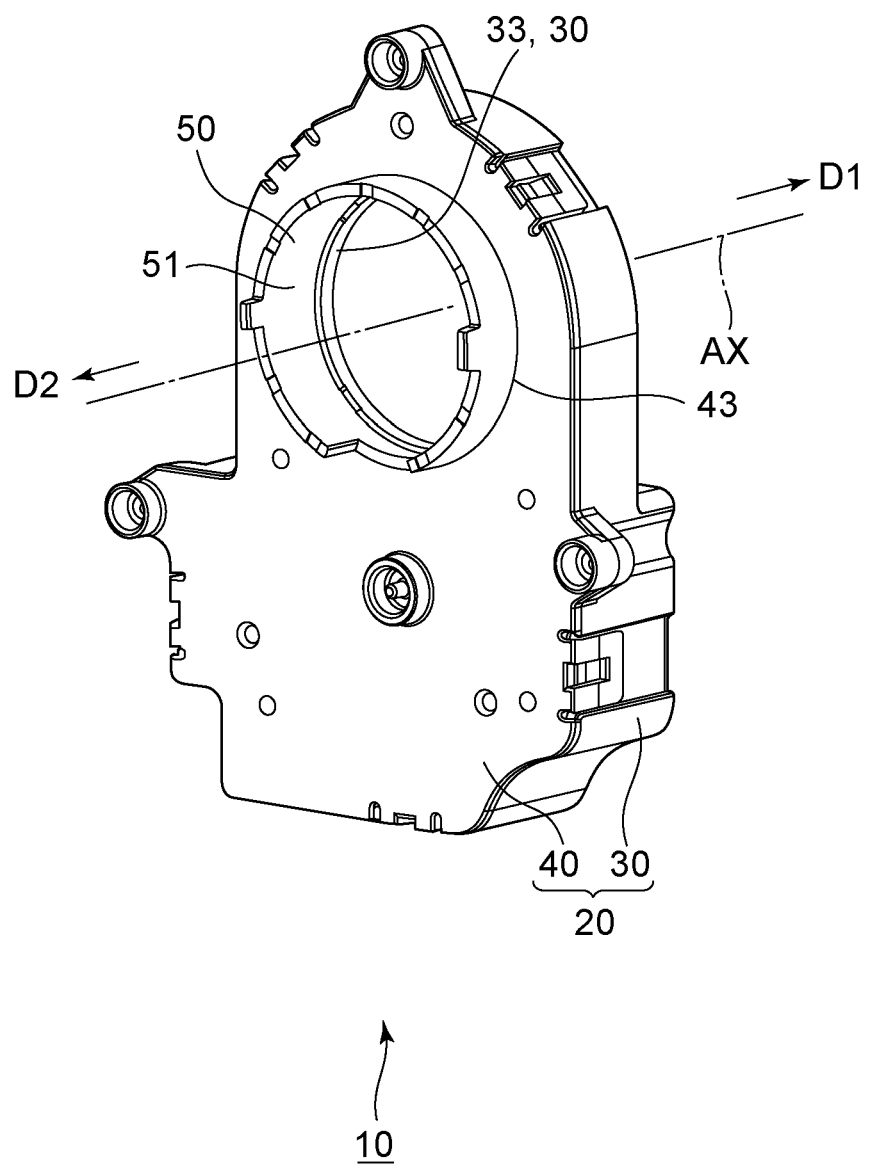
FIG. 2 is a rear perspective view of the rotation detection device illustrated in FIG. 1.
Figure 3:
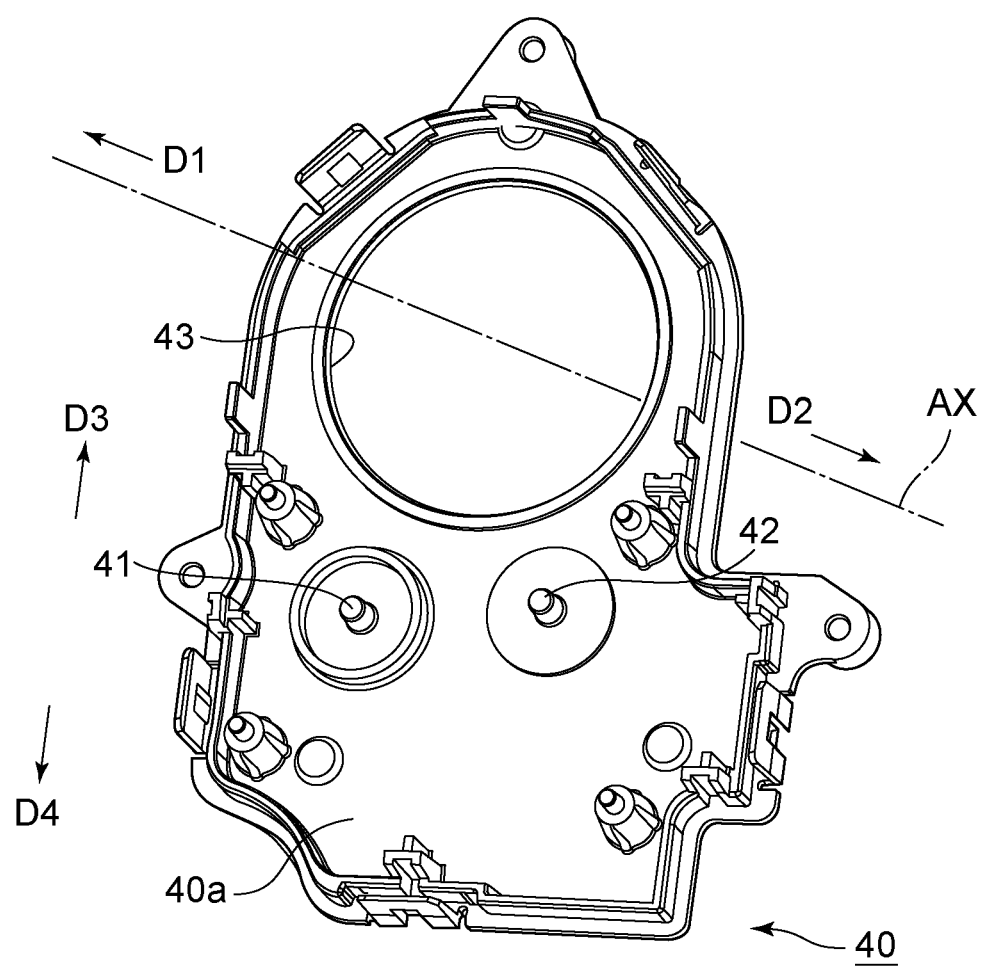
FIG. 3 is a front perspective view illustrating the structure of a case portion.
Figure 4A:
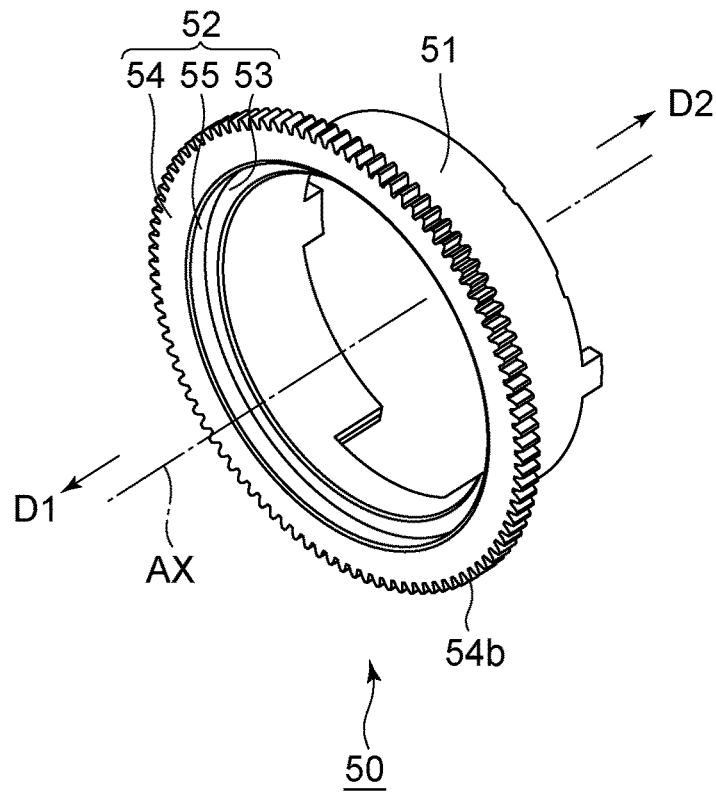
FIGS. 4A and 4B are perspective views illustrating the structure of a wheel portion.
Figure 4B:
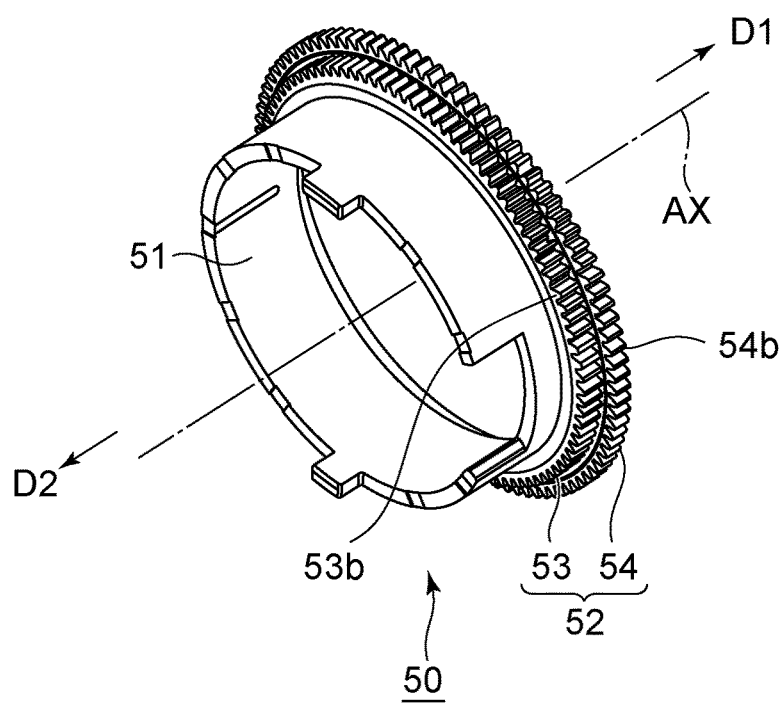
Figure 5:
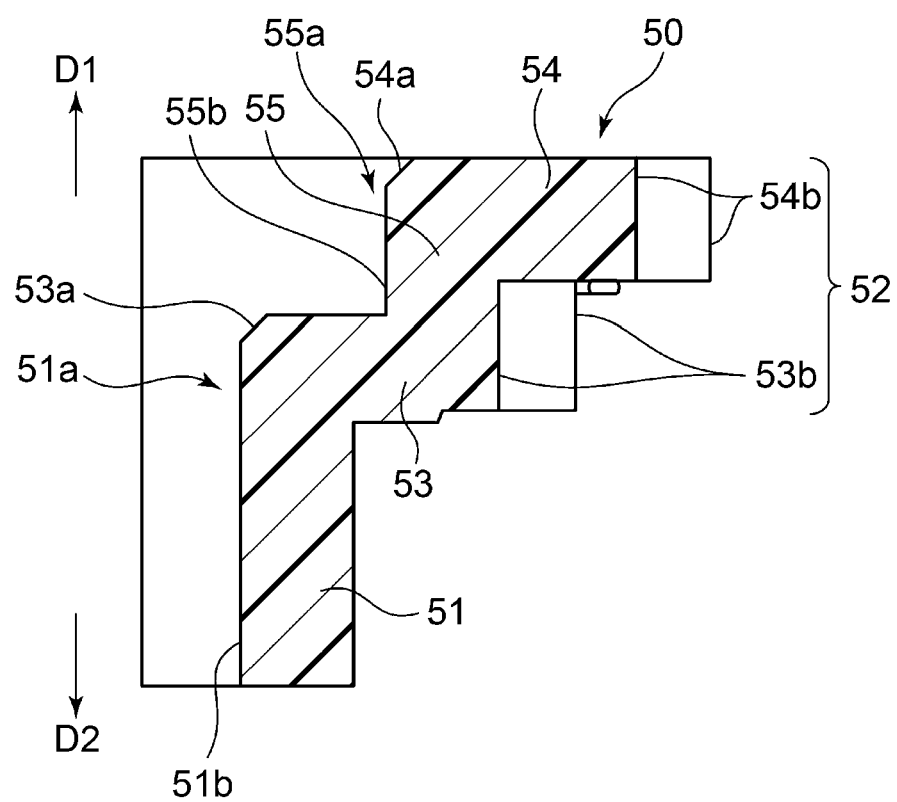
FIG. 5 is an enlarged partial sectional view illustrating the structure of a tubular portion and a projecting edge portion of the wheel portion.
Figure 6:
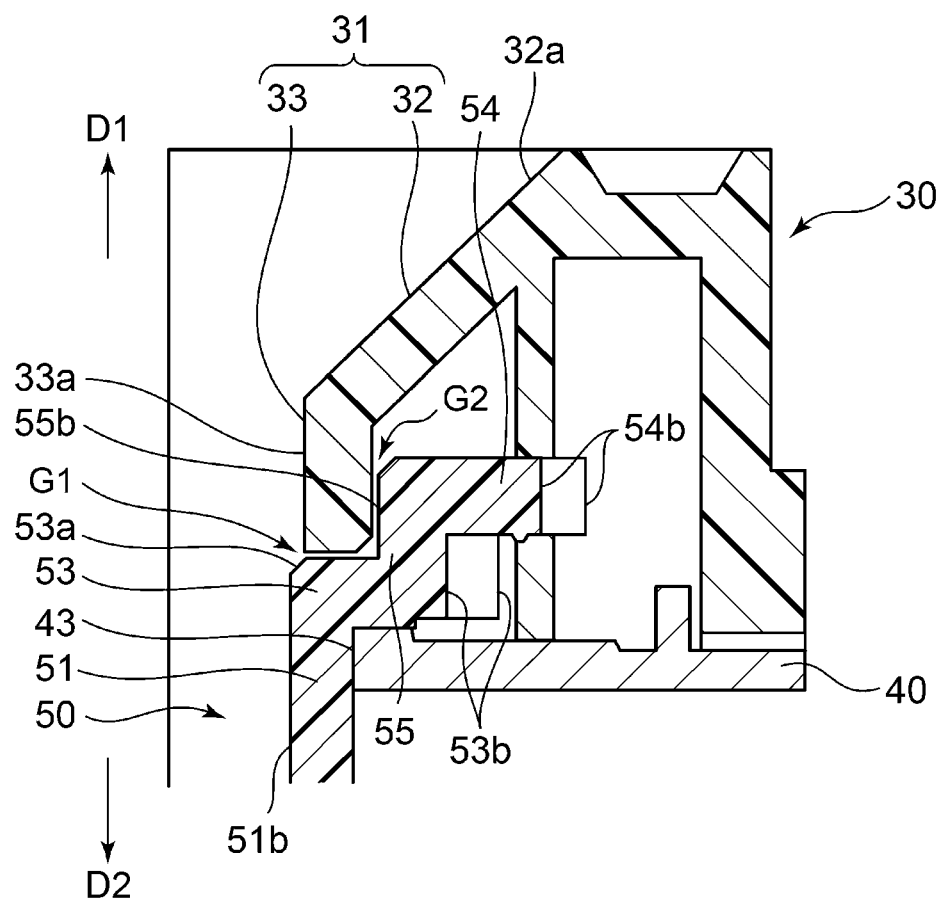
FIG. 6 is an enlarged partial sectional view illustrating a state in which the wheel portion illustrated in FIG. 5 is retained in a housing portion.

A rotation detection device according to an embodiment of the present invention will now be described in detail with reference to the drawings. FIGS. 1 and 2 are perspective views illustrating the structure of a rotation detection device 10 according to the present embodiment. FIG. 1 shows a view from the front (D1 side in FIG. 1), and FIG. 2 shows a view from the rear (D2 side in FIG. 1). FIG. 3 is a front perspective view illustrating the structure of a case portion 40. FIGS. 4A and 4B show perspective views illustrating the structure of a wheel portion 50. FIG. 4A shows a view from the front, and FIG. 4B shows a view from the rear. FIG. 5 is an enlarged partial sectional view illustrating the structure of a tubular portion 51 and a projecting edge portion 52 of the wheel portion 50. FIG. 6 is an enlarged partial sectional view illustrating a state in which the wheel portion 50 is retained in a housing portion 20. In each figure, the D1 direction is the forward direction and the D2 direction is the rearward direction. A view in the front-to-rear direction may be referred to as a plan view.

As illustrated in FIGS. 1 and 2, the rotation detection device 10 includes the housing portion 20 and the wheel portion 50 retained by the housing portion 20. The housing portion 20 is formed by joining a cover portion 30 disposed at the front and the case portion 40 disposed at the rear together in the front-rear direction. The housing portion 20 and the wheel portion 50 may be formed of various materials. For example, the housing portion 20 may be formed of polybutadiene terephthalate (PBT), and the wheel portion 50 may be formed of polyacetal or polyoxymethylene (POM). In such a case, abrasion between these materials can be reduced owing to the difference therebetween in the modulus of elasticity.

The cover portion 30 has an opening portion 31 extending therethrough in the front-rear direction (D1-D2 direction) and having a circular shape in plan view. As illustrated in FIGS. 1 and 6 (in FIG. 6, the D1 direction is upward in the drawing), the opening portion 31 includes an inclined portion 32 having a diameter that decreases with increasing distance in the front-to-rear direction and an annular portion 33 that extends from the rear end of the inclined portion 32 in a thin plate shape in the front-rear direction. The inclined portion 32 has an inner surface 32a that serves as a guide surface that guides a shaft body B inserted into the housing portion 20.

As illustrated in FIG. 3, the case portion 40 has an opening portion 43 extending therethrough in the front-rear direction and having a circular shape in plan view. When the cover portion 30 and the case portion 40 are joined together, the opening portion 43 is at a position corresponding to the position of the opening portion 31 of the cover portion 30. In other words, the opening portion 31 of the cover portion 30 and the opening portion 43 of the case portion 40 are arranged so that central axes thereof coincide and extend in the front-rear direction. These two opening portions 31 and 43 define an opening 20a (FIG. 1) that extends through the housing portion 20 in the front-rear direction. Two shaft portions 41 and 42 which each extend forward are provided on a front surface 40a of the case portion 40 in a region below the opening portion 43.

A shaft body B that serves as a detection object, for example, a steering shaft, is inserted into the opening 20a in the front-rear direction from the front side toward the rear side of the opening portion 31. Thus, the front side (D1 side) is the upstream side in the direction in which the shaft body B is inserted, and the rear side (D2 side) is the downstream side in the direction in which the shaft body B is inserted.

As illustrated in FIGS. 1 and 2, the wheel portion 50, which serves as a rotor, is retained by the housing portion 20 in such a manner that the wheel portion 50 is rotatable about a rotational axis AX. The wheel portion 50 has a circular shape in plan view, and is arranged concentrically to the opening portion 31 of the cover portion 30 and the opening portion 43 of the case portion 40 with the rotational axis AX serving as the central axis. Thus, the rotational axis AX of the wheel portion 50 is arranged to extend in the front-rear direction (D1-D2 direction).

The shaft body B and the wheel portion 50 are in spline engagement with each other. For example, a projection provided on the shaft body B and a recess provided in the wheel portion 50 (projection and recess are not illustrated) are fitted together to form a joined portion. Accordingly, when the shaft body B is rotated about a rotational axis thereof, the wheel portion 50 also rotates about the rotational axis AX thereof.

When the rotation detection device 10 is attached to an attachment portion (not illustrated), the attachment portion may, for example, have a member (hereinafter referred to as an interlocking member) into which the shaft body B is inserted, similarly to the tubular portion 51, and that rotates in response to rotation of the shaft body B. In such a case, the following structure may be employed. That is, the interlocking member may be connected to the shaft body B, and one end of the wheel portion 50 (tubular portion 51) may be connected to the interlocking member so that the wheel portion 50 rotates in response to rotation of the shaft body B.

As illustrated in FIGS. 4A and 4B, the wheel portion 50 includes the tubular portion 51, which is hollow and has the rotational axis AX as the central axis thereof, and the projecting edge portion 52, which extends toward an outer side from the front end of the tubular portion 51. In other words, the projecting edge portion 52 is formed to extend in directions away from the rotational axis AX. Here, the outer side means the side away from the rotational axis AX, and the inner side means the side toward the rotational axis AX.

As illustrated in FIGS. 4A to 6, the projecting edge portion 52 includes a small diameter portion 53, a large diameter portion 54, and a step portion 55.

As illustrated in FIG. 5, the small diameter portion 53 is formed to extend toward the outer side from a front end portion 51a of the tubular portion 51, and has an annular shape. The small diameter portion 53 has teeth 53b with a predetermined pitch on an outer peripheral surface thereof (see FIG. 9). A ridge portion 53a between an inner peripheral surface 51b of the tubular portion 51 and the small diameter portion 53 is chamfered. Accordingly, even when the shaft body B that is being inserted comes into contact with the ridge portion 53a, the possibility that the shaft body B or the wheel portion 50 will be damaged or the assembly positions thereof will be displaced can be reduced.

Figure 9:
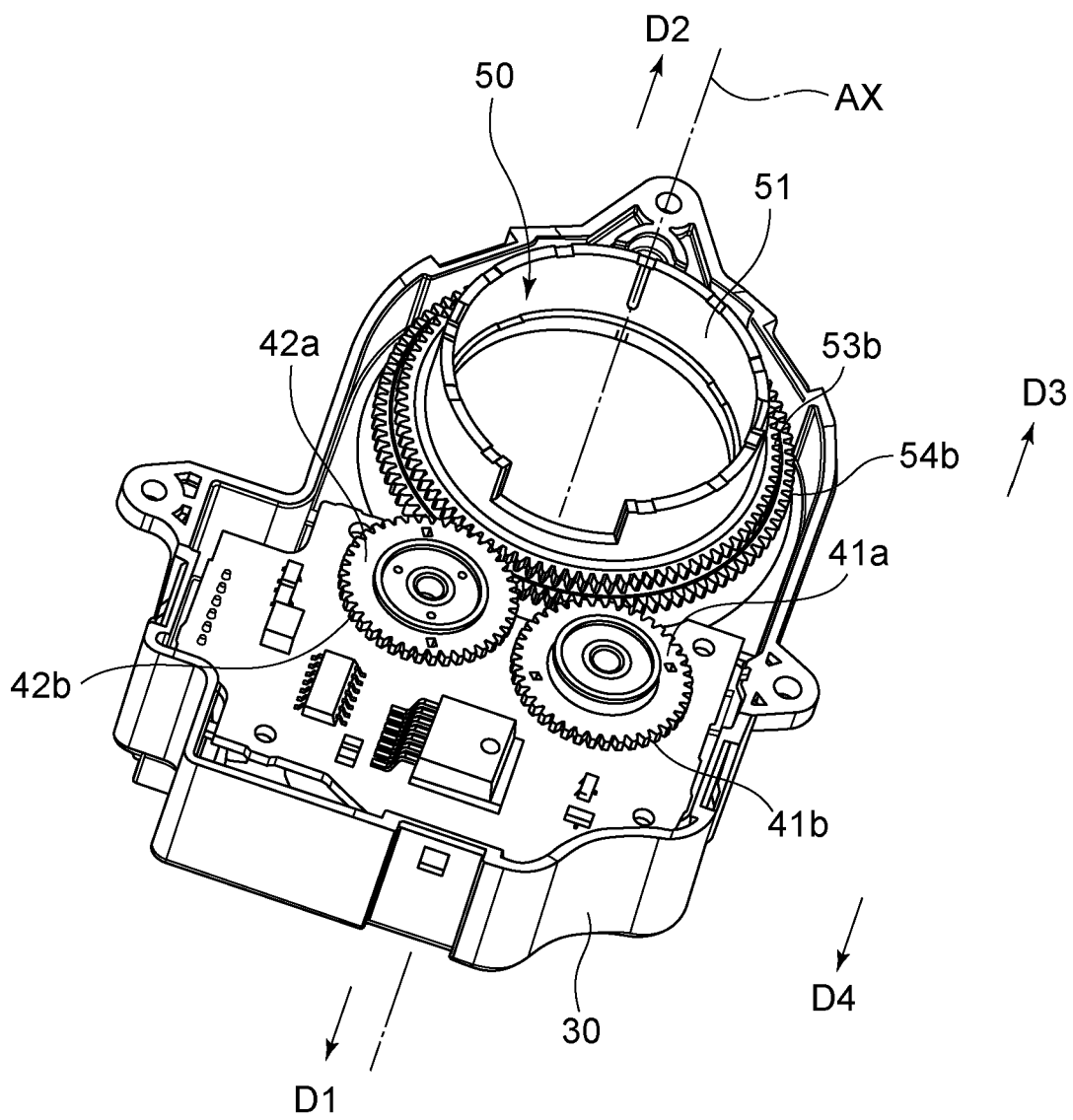
FIG. 9 is a rear perspective view illustrating a state in which the case portion is removed.

The step portion 55 extends forward (toward the D1 side) from an outer end of the small diameter portion 53. The large diameter portion 54 is formed to extend toward the outer side from a front end portion 55a of the step portion 55. The large diameter portion 54 has an annular shape with an inner diameter greater than that of the small diameter portion 53, and has teeth 54b with a pitch equal to that of the teeth 53b of the small diameter portion 53 on an outer peripheral surface thereof (see FIG. 9). As illustrated in FIG. 9, the teeth 53b of the small diameter portion 53 and the teeth 54b of the large diameter portion 54 are arranged at positions corresponding to each other in the circumferential direction. A ridge portion 54a between an inner peripheral surface 55b of the step portion 55 and the large diameter portion 54 is also chamfered. Since the ridge portion 54a is chamfered, even when the outer surface of the opening portion 31 comes into contact with the ridge portion 54a upon engagement between the cover portion 30 and the wheel portion 50, the possibility of damage to the cover portion 30 or the wheel portion 50 can be reduced, and sufficient assembly accuracy can be ensured.

The pitch of the teeth 53b of the small diameter portion 53 and the pitch of the teeth 54b of the large diameter portion 54 are not necessarily equal.

As illustrated in FIG. 6, the wheel portion 50 is retained between the cover portion 30 and the case portion 40 in the front-rear direction (D1-D2 direction). More specifically, in a rear section (D2-side section) of the wheel portion 50, the small diameter portion 53 is supported by the case portion 40 positioned therebehind, and the tubular portion 51 is supported by an inner peripheral surface of the opening portion 43. The tubular portion 51 extends rearward (in the D2 direction) beyond the opening portion 43. In a front section (D1-side section), the annular portion 33 of the opening portion 31 is disposed on the inner side of (closer to the center than) the step portion 55, and the inner peripheral surface 55b of the step portion 55 and the annular portion 33 of the opening portion 31 extend parallel to each other in the front-rear direction. The annular portion 33 of the opening portion 31 is located on an L-shaped bent portion formed by the tubular portion 51 and the step portion 55, so that movement of the wheel portion 50 in the front-rear direction is restrained. As illustrated in FIG. 6, the inner peripheral surface 33a of the annular portion 33 is at substantially the same position as the inner peripheral surface 51b of the tubular portion 51 in a direction orthogonal to the front-rear direction (left-right direction in FIG. 6). Therefore, the inner surface of the opening 20a has small irregularities. When the cover portion 30 and the case portion 40 are joined together in the above-described state, the wheel portion 50 is retained in the housing portion 20 such that the wheel portion 50 is rotatable about the rotational axis AX.

The shaft body B is inserted into the housing portion 20 assembled as described above from a position in front of (on the D1-side of) the opening 20a (opening portion 31 of the cover portion 30). Even when the wheel portion 50 has attachment errors or manufacturing errors in shape, the shaft body B can be prevented from coming into hard contact with the wheel portion 50 because the ridge portion 53a between the tubular portion 51 and the small diameter portion 53 is chamfered. Accordingly, the possibilities of damage to the shaft body B or the wheel portion 50 and displacements between the cover portion 30, the case portion 40, and the wheel portion 50 can be reduced. In addition, since the opening portion 31 of the cover portion 30 includes the inclined portion 32 having the inner surface 32a that serves as a guide surface, the shaft body B can be smoothly guided rearward through the opening 20a. Furthermore, the inner peripheral surface 33a of the annular portion 33 and the inner peripheral surface 51b of the tubular portion 51 are arranged at substantially the same position in a direction orthogonal to the front-rear direction. Therefore, when the shaft body B is advanced into the wheel portion 50 from the space inside the opening portion 31 of the cover portion 30, the shaft body B can be smoothly inserted with less risk of interference with the inner peripheral surface 51b of the wheel portion 50. In addition, when the shaft body B is inserted into the wheel portion 50, the shaft body B is guided by the annular portion 33 until the shaft body B reaches the position of the inner peripheral surface 51b. Therefore, the possibility that the shaft body B will come into direct contact with the wheel portion 50 is further reduced. Accordingly, force is not easily applied in a direction for cancelling the engagement between the cover portion 30 and the case portion 40.

When the shaft body B comes into contact with the inclined portion 32, the impact is dissipated and is not easily transmitted to the wheel portion 50.

As illustrated in FIG. 6, the annular portion 33 of the cover portion 30 and the wheel portion 50 have a gap G1 therebetween in the front-rear direction and a gap G2 therebetween in a direction orthogonal to the front-rear direction. Therefore, even when the shaft body B that is being inserted comes into contact with the opening portion 31, the impact is not easily transmitted to the wheel portion 50, so that the occurrence of, for example, damage to and displacement of the wheel portion 50 can be reduced. In addition, when the wheel portion 50 rotates together with the shaft body B, abrasion of the annular portion 33 can be prevented. In addition, a large space is provided between the inclined portion 32 of the cover portion 30 and the wheel portion 50 on the inner side of the inclined portion 32. Therefore, even when the shaft body B comes into contact with the inclined portion 32, the impact is not easily transmitted to the wheel portion 50.

Figure 7:
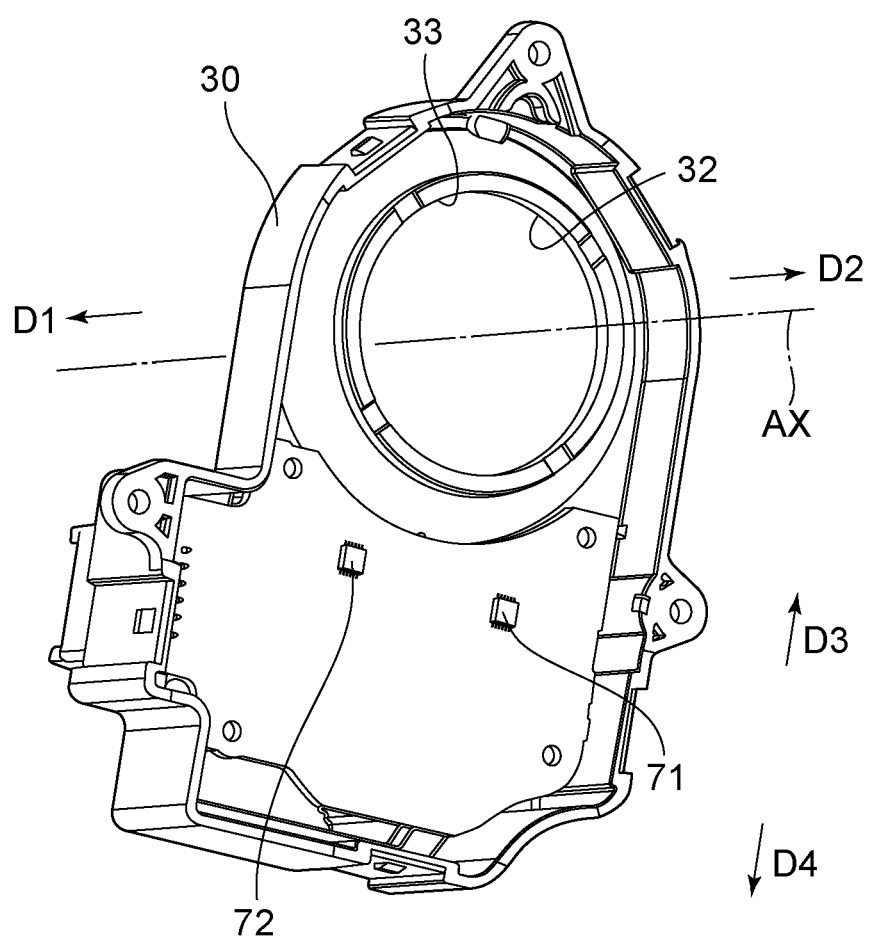
FIG. 7 is a rear perspective view of a cover portion.
Figure 8:
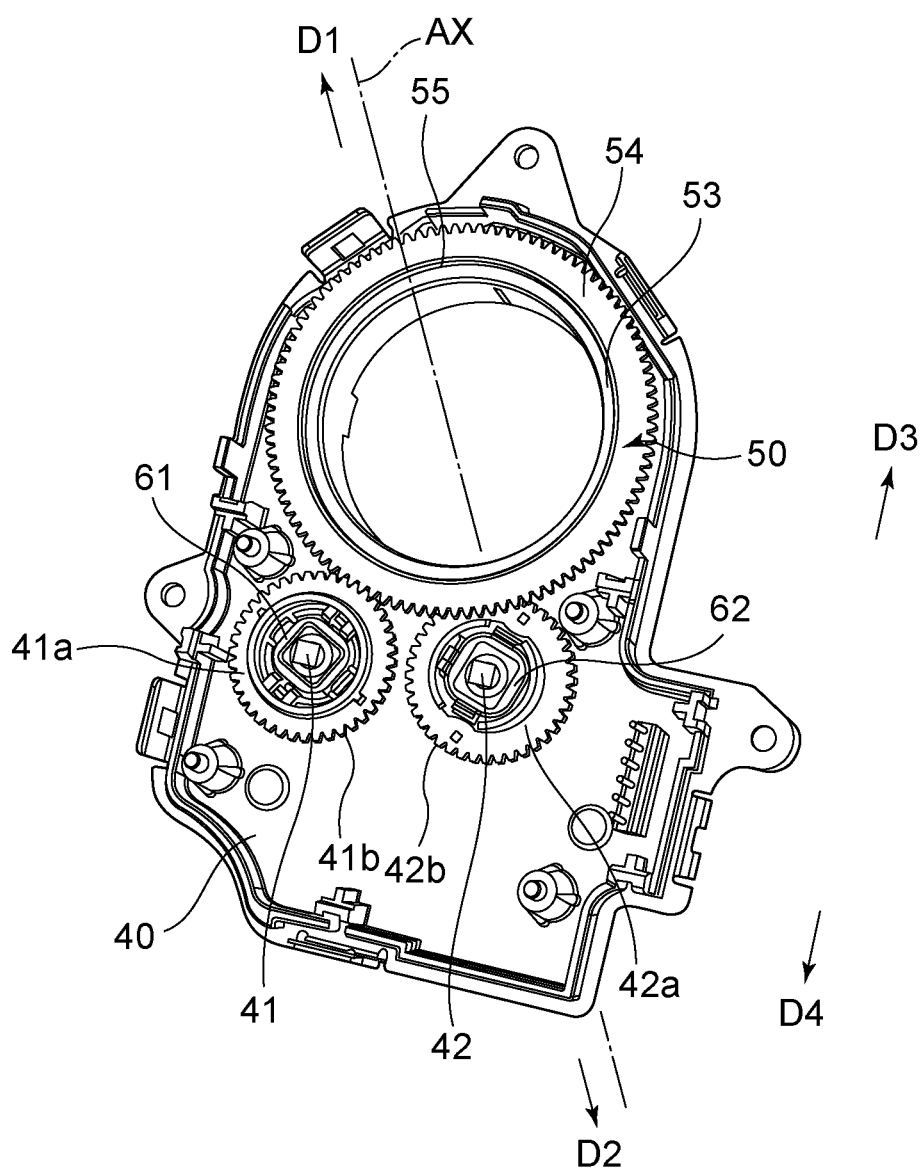
FIG. 8 is a front perspective view illustrating a state in which the cover portion is removed.
Figure 10:
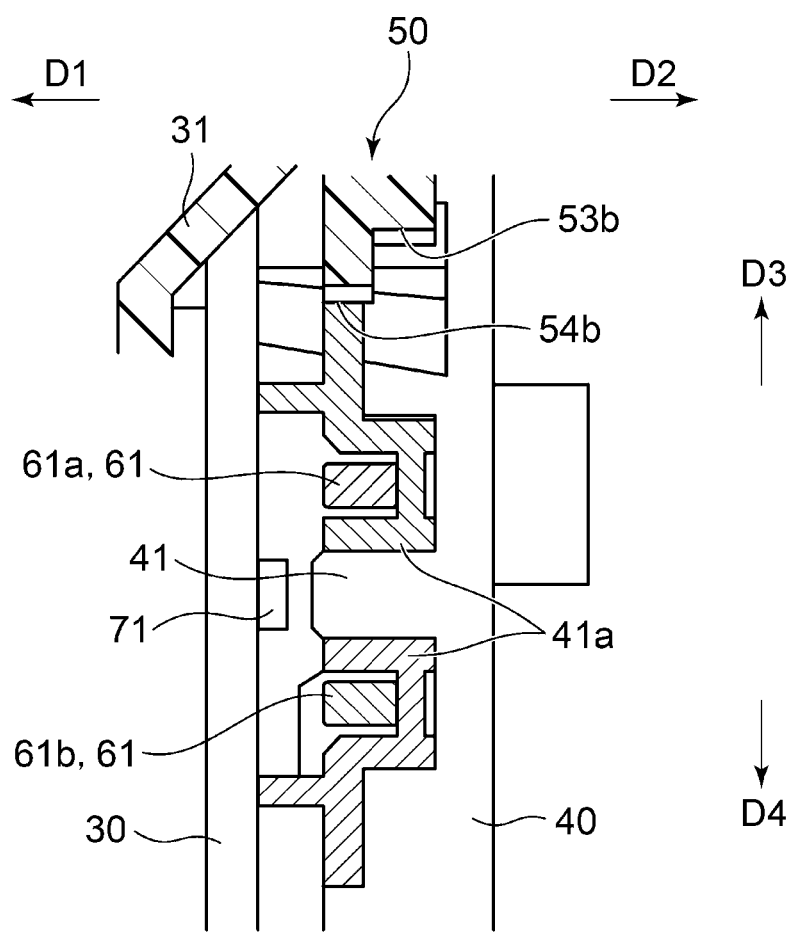
FIG. 10 is an enlarged partial sectional view illustrating the relationship between a magnetic detection portion and a magnet body.

FIG. 7 is a rear perspective view of the cover portion 30. FIG. 8 is a front perspective view illustrating a state in which the cover portion 30 is removed. FIG. 9 is a rear perspective view illustrating a state in which the case portion 40 is removed. FIG. 10 is an enlarged partial sectional view illustrating the relationship between a magnetic detection portion 71 and a magnet body 61. In FIGS. 7 and 8, a circuit board and other components are not illustrated. In FIGS. 7 to 10 and in FIG. 3, the D3 direction is the upward direction and the D4 direction is the downward direction.

As illustrated in FIG. 3, the case portion 40 has two shaft portions 41 and 42. As illustrated in FIG. 7, the cover portion 30 has two magnetic detection portions 71 and 72 at positions corresponding to the positions of the shaft portions 41 and 42 when the cover portion 30 is joined to the case portion 40. The magnetic detection portions 71 and 72 may be various magnetic sensors, such as Hall elements or magnetoresistive elements.

As illustrated in FIG. 8, the shaft portions 41 and 42 respectively support gears 41a and 42a, and the gears 41a and 42a are respectively rotatable about the shaft portions 41 and 42. A first magnet body 61 is fixed in the gear 41a, and a second magnet body 62 is fixed in the gear 42a. The outer shape of the magnet bodies 61 and 62 is a substantially square loop shape in plan view, and the shaft portions 41 and 42 are disposed at the centers of the loops. In other words, the magnet bodies 61 and 62 are arranged to be rotatable about the shaft portions 41 and 42 together with the gears 41a and 42a. The outer shape of the magnet bodies 61 and 62 in plan view may instead be a polygonal shape other than the substantially square shape or an annular shape.

The gear 41a has teeth 41b with a predetermined pitch on an outer peripheral surface thereof, and is arranged to mesh with the teeth 54b of the wheel portion 50.

The gear 42a has teeth 42b with a predetermined pitch on an outer peripheral surface thereof, and is arranged to mesh with the teeth 53b of the wheel portion 50. When the wheel portion 50 rotates in response to rotation of the shaft body B, the gear 41a that meshes with the teeth 54b of the wheel portion 50 rotates about the shaft portion 41, and the gear 42a that meshes with the teeth 53b rotates about the shaft portion 42. These rotations cause changes in the orientations of the magnet bodies 61 and 62. In other words, the orientations of the magnetic fields generated by the magnet bodies 61 and 62 change.

As illustrated in FIG. 10, in the up-down direction (D3-D4 direction), the magnetic detection portion 71 is positioned to face the shaft portion 41, and the magnet body 61 is disposed so that the shaft portion 41 is positioned between portions thereof. For example, the magnet body 61 illustrated in FIG. 10 may have an N-pole in an upper region 61a thereof and an S-pole in a lower region 61b thereof. In this case, lines of magnetic force extend from the N-pole to the S-pole, and the magnetic detection portion 71, which is located at an intermediate position along the lines of magnetic force, measures the magnitude and direction of the magnetic field generated by the magnet body 61. When the magnet body 61 rotates about the shaft portion 41 in response to rotation of the shaft body B, the information regarding the magnetic field measured by the magnetic detection portion 71 changes. The rotational angle of the shaft body B can be calculated based on this change.

The structure and operation of the magnet body 62 are similar to those of the magnet body 61 described above. The structures of the magnet body 61 and the magnet body 62 are not limited to the above-described structure.

Modifications will now be described.

In the above-described embodiment, the inner peripheral surface 33a of the annular portion 33 of the opening portion 31 is at substantially the same position as the inner peripheral surface 51b of the tubular portion 51 of the wheel portion 50 in a direction orthogonal to the front-rear direction. However, the inner peripheral surface 33a of the annular portion 33 may instead be disposed on the inner side of the inner peripheral surface 51b of the tubular portion 51. In such a case, the possibility that the shaft body B inserted into the opening portion 31 of the cover portion 30 will come into contact with the ridge portion 53a of the wheel portion 50 can be reduced, so that the shaft body B can be smoothly inserted into the wheel portion 50. Accordingly, the possibilities of damage to the shaft body B or the wheel portion 50 and displacements between the cover portion 30, the case portion 40, and the wheel portion 50 can be reduced.

Although the present invention has been described with reference to the above-described embodiment, the present invention is not limited to the above-described embodiment. Modifications or alterations are possible within the scope of the object of the modifications or the idea of the present invention.

As described above, a rotation detection device according to the present invention is advantageously capable of preventing contact between a shaft body and a rotor even when a wheel portion, which serves as the rotor, has attachment errors or manufacturing errors, or capable of reducing damage to and displacements of the components even when the contact occurs.

What is claimed is:

1. A rotation detection device comprising:
   a housing portion;
   a wheel portion having a rotational axis and retained by the housing portion such that the wheel portion is rotatable about the rotational axis;
   a magnet body retained by the housing portion, the magnet body rotating in response to rotation of the wheel portion so that a magnetic field of the magnet body changes; and
   a magnetic detection portion disposed on the housing portion at a position corresponding to a position of the magnet body, the magnetic detection portion detecting the magnetic field of the magnet body,
   wherein the wheel portion allows a shaft body that serves as a detection object to be inserted therein in a direction of the rotational axis from a position in front of the wheel portion, and is rotated about the rotational axis when the shaft body is rotated,
   wherein the wheel portion includes a tubular portion in which the shaft body is inserted and a projecting edge portion extending away from the rotational axis at a front end of the tubular portion,
   wherein the housing portion includes a cover portion having a hollow tubular opening portion in which the shaft body is inserted, and
   wherein the cover portion and the wheel portion are engaged with each other such that the opening portion is located on an inner side of the projecting edge portion.

2. The rotation detection device according to claim 1, wherein a ridge portion between an inner peripheral surface of the tubular portion and the projecting edge portion is chamfered.

3. The rotation detection device according to claim 1, wherein an inner peripheral surface of the opening portion includes a guide surface shaped such that an inner diameter of the guide surface decreases with increasing distance toward a downstream side in a direction in which the shaft body is inserted.

4. The rotation detection device according to claim 1, wherein the projecting edge portion includes a step portion forming a small diameter portion at a downstream side in a direction in which the shaft body is inserted and a large diameter portion located upstream of the small diameter portion and having an inner diameter greater than an inner diameter of the small diameter portion, and wherein the opening portion is engaged with the step portion so that the cover portion and the wheel portion are joined together.

\* \* \* \* \*